United States Patent
Poniatowski (10) Patent No.: US 8,270,578 B2
(45) Date of Patent: Sep. 18, 2012

(54) MOBILE PAYMENT SYSTEM

(75) Inventor: Paul Poniatowski, Toronto (CA)

(73) Assignee: Paul Poniatowski, Toronto (CA)

( * ) Notice: Subject to any disclaimer, the term of this patent is extended or adjusted under 35 U.S.C. 154(b) by 325 days.

(21) Appl. No.: 12/596,531

(22) Filed: Oct. 19, 2009

(65) Prior Publication Data

US 2011/0320289 A1    Dec. 29, 2011

Related U.S. Application Data

(63) Continuation-in-part of application No. 12/087,539, filed as application No. PCT/CA2004/000513 on Apr. 7, 2004.

(51) Int. Cl.
*H04M 11/00* (2006.01)

(52) U.S. Cl. ............. 379/93.12; 379/93.22; 235/462.45; 235/472.01

(58) Field of Classification Search ............... 379/93.12, 379/93.17, 93.22, 91.01, 201.01, 201.02; 455/419; 235/462.45, 472.01, 472.02, 462.46, 235/262.46

See application file for complete search history.

(56) References Cited

U.S. PATENT DOCUMENTS

| | | | |
|---|---|---|---|
| 5,412,708 A | 5/1995 | Katz | |
| 5,774,534 A | 6/1998 | Mayer | |
| 5,896,129 A | 4/1999 | Murphy et al. | |
| 6,078,806 A * | 6/2000 | Heinonen et al. | 455/406 |
| 6,112,984 A * | 9/2000 | Snavely | 235/379 |
| 6,169,911 B1 * | 1/2001 | Wagner et al. | 455/566 |
| 6,222,826 B1 | 4/2001 | Faynberg et al. | |
| 6,577,861 B2 * | 6/2003 | Ogasawara | 455/419 |
| 7,040,541 B2 * | 5/2006 | Swartz et al. | 235/472.02 |
| 7,149,549 B1 | 12/2006 | Ortiz et al. | |
| 7,308,254 B1 * | 12/2007 | Rissanen | 455/414.1 |
| 7,388,578 B2 * | 6/2008 | Tao | 345/173 |
| 8,135,798 B2 * | 3/2012 | Welingkar et al. | 709/217 |
| 2001/0032131 A1 | 10/2001 | Mowry | |
| 2002/0022476 A1 | 2/2002 | Go | |
| 2002/0094787 A1 | 7/2002 | Avnet et al. | |
| 2002/0130967 A1 | 9/2002 | Sweetser | |
| 2002/0162113 A1 | 10/2002 | Hunter | |
| 2002/0194264 A1 | 12/2002 | Uchiyama et al. | |
| 2002/0194622 A1 | 12/2002 | Lord | |
| 2005/0017068 A1 * | 1/2005 | Zalewski et al. | 235/380 |

FOREIGN PATENT DOCUMENTS

| | | |
|---|---|---|
| CN | 2179993 | 10/1994 |
| GB | 2344009 | 5/2000 |
| WO | 98/11686 | 3/1998 |
| WO | 01/27899 | 4/2001 |
| WO | 01/33859 | 5/2001 |
| WO | 02/084909 | 10/2002 |
| WO | 02/093544 | 11/2002 |

* cited by examiner

*Primary Examiner* — Olisa Anwah
(74) *Attorney, Agent, or Firm* — Occhiuti Rohlicek & Tsao LLP (57) ABSTRACT

An apparatus for engaging in wireless commercial transactions includes a mobile phone equipped with a dedicated actuator for initiating a commercial transaction, and an optical input for receiving information concerning prices of goods; a network hub for wireless exchange information between a commercial establishment and said mobile phone within the boundaries of the establishment; and a financial/authorization institution for associating a PIN number with said mobile phone and for authorizing transactions initiated by said mobile phone.

28 Claims, 9 Drawing Sheets

MOBILE PAYMENT SYSTEM

RELATED APPLICATIONS

This application is a continuation-in-part under 35 USC 120 of U.S. application Ser. No. 12/087,539, filed on Jul. 9, 2008, which is the U.S. national stage application, under 35 USC 371, of PCT/CA2004/00513, filed on Apr. 7, 2004, and a continuation-in-part of U.S. patent application Ser. No. 10/407,222, filed on Apr. 7, 2003, which issued as U.S. Pat. No. 7,606,215 on Oct. 20, 2009, the contents of which are all herein incorporated by reference.

FIELD OF THE DISCLOSURE

This disclosure pertains to wireless networks, and in particular, to applications of wireless networks of a retail establishment.

BACKGROUND OF THE INVENTION

The recent communications revolution has increased the amount of data available to the public. The public's hunger for more and more information has been whetted by this excess of information.

Current systems for information dissemination, especially for disseminating to the members of the public who take public means of transportation, are currently inadequate. These systems are solely visual and static. Sandwich boards, billboards, and other very old static forms of advertising are used for such ends. However, as noted above, these systems are inadequate. Such static forms are purely visual and cannot be readily changed in response to changed conditions. Unfortunately, the ubiquity of televisions and computers have had a deleterious effect on the attention span of the average person. As such, current static systems are unable to keep people's attention.

Another major drawback of current systems is the lack of an audio component. Again, the proliferation of multi-media devices and the ubiquity of multi-media in today's society has the public clamoring for the same presentation type in almost all of their information input. While there are some information dissemination systems that integrate an audio portion (such as publicly accessible television sets), these can be intrusive and annoying to those who do not wish to take advantage of the system.

There is therefore a need for an information dissemination system that integrates both video and audio components while simultaneously avoiding becoming an annoyance to those not wishing to access the information being disseminated. Such an information dissemination system should also be dynamic in that modifying the information content should be relatively simple. Furthermore, the system should be able to keep end users (i.e. the public, especially those who are travelling in public transportation vehicles) occupied and should be able to hold their attention. Finally, it is also very desirable if such a system would be cost effective and financially self sustaining. It is therefore an object of the present invention to mitigate if not overcome the deficiencies of the prior art.

SUMMARY OF THE INVENTION

In one aspect, the invention features an apparatus for engaging in wireless commercial transactions. Such an apparatus includes a mobile phone equipped with a dedicated actuator for initiating a commercial transaction, and an optical input for receiving information concerning prices of goods; a network hub for wireless exchange information between a commercial establishment and said mobile phone within the boundaries of the establishment; and a financial/authorization institution for associating a PIN number with said mobile phone and for authorizing transactions initiated by said mobile phone.

These and other aspects of the invention will be apparent from the following detailed description and the accompanying drawings, in which:

DETAILED DESCRIPTION

Figure 1:
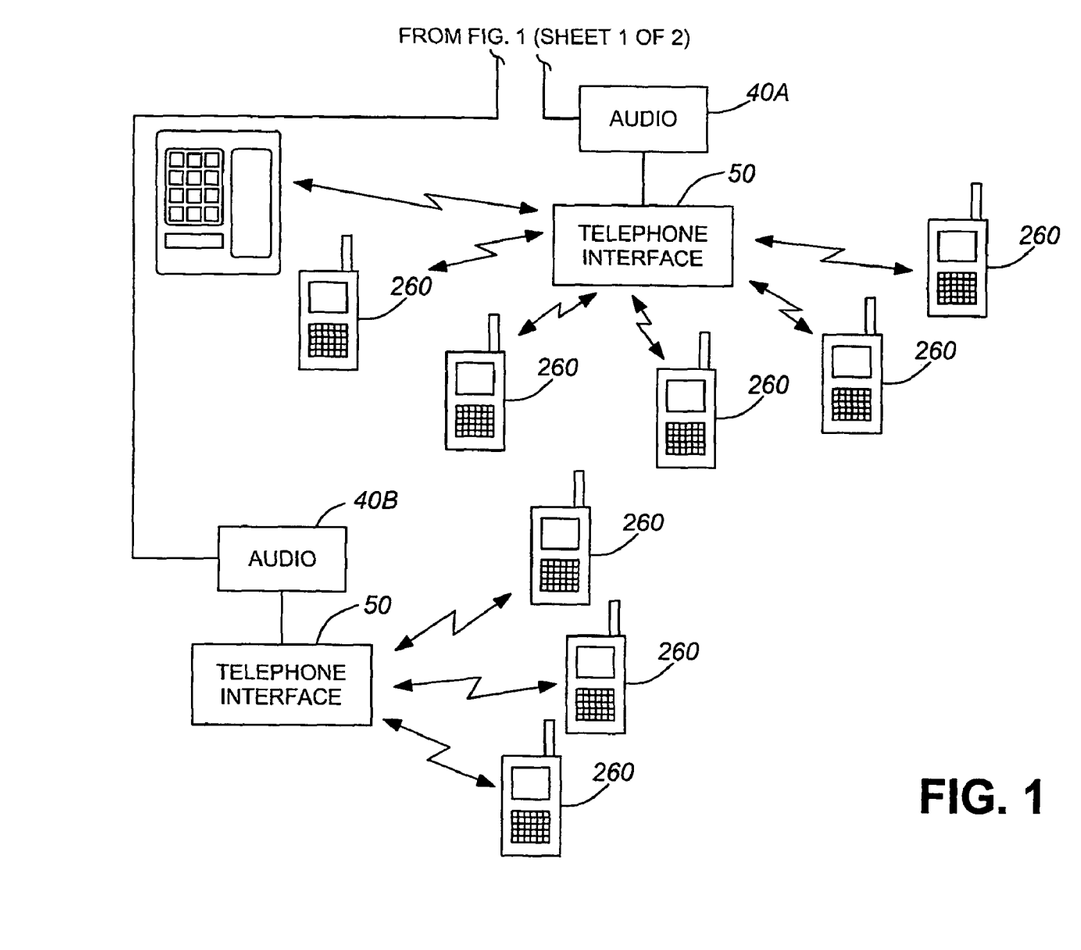
FIG. 1 is a block diagram of a system for distributing information according to one aspect of the invention.

Referring to FIG. 1, a block diagram of a system for distributing information is illustrated. The system has 10 has a network hub 20, multiple video distribution hubs 30A-30E, audio distribution hubs 40A, 40B, and at least one telephone interface 50. The network hub receives multiple audio feeds 60, video feeds 70, and hub end combined audio/video feeds 80 from a variety of sources. These feeds are then separated into dedicated audio only and video-only feeds. The dedicated audio-only feeds are sent to the audio distribution hubs 40A, 40B while the dedicated video-only feeds are sent to the video distribution hubs 30A-30E. At the video distribution hubs, the relevant video only feeds are transmitted to multiple video display screens 90A-90K by transmitters 100A-100E. On the audio side, the telephone interface 50 receives the dedicated audio only feed and routes this to the telephone interface 50. The telephone interface 50 receives telephone calls from end users who wish to access one of the audio feeds. The end users, who could be calling and using their mobile or cellular telephones, can select one of the available audio feeds. Based on the end user input, the interface 50 selects the relevant audio feed and routes this feed to the relevant end user.

The network hub 20 can be seen as an audio/video feed aggregator—it receives feeds from a variety of sources and collects and combines these feeds into two signals, a dedicated audio feed and a dedicated video feed. The sources from which the feeds originate may be legion—the feeds could come from the Internet, a cable TV provider, broadcast TV, broadcast radio, a dedicated video or audio signal specifically created for the system, or any other source. The network hub 20 separates the feeds depending on the content—video feeds are separated and routed differently from audio feeds using well-known methods and techniques. Video feeds are aggregated into a first single signal with different video feeds occupying different parts or frequencies of that first single signal. Audio feeds are aggregated into a second single signal with different audio feeds occupying different parts or frequencies of that second single signal. The video feed signal (the first single signal) is then transmitted to the video distribution hubs 30A-30E. The audio feed signal (the second single signal) is transmitted to the audio distribution hubs 40A, 40B.

Regarding the video distribution hubs 30A-30E, each one can "tune" into or isolate one of the video fees aggregated into the video feed signal from the network hub 20. The video feed that a distribution hub tunes into is then passed to a corresponding transmitter. A transmitter then transmits the video feed to multiple video display screens. Each video distribution hub 30A-30E can be a video tuner which tunes to a specific video feed in the video feed signal. Such tuners are well-known in the art.

The transmitters 100A-100E may be, depending on the implementation, wireless, wired, or optical transmitters. The transmitters 100A-100E transmit the isolated or tuned into video feed to the different video display screens. Each video transmission hub and transmitter combination services video display screens located at a specific geographic area. Thus, one geographic area may have display screens 90A, 90B, 90C, showing video feed A as tuned to by video transmission hub 30A while another geographic area may have display screens 90G, 90H showing video feed B as tuned to by video transmission hub 30D. Such an arrangement allows area—or region—centric video feeds to be distributed to the proper areas. Such an arrangement also allows the system to quickly change what is being shown in the video display screen in a specific area. As an example, if an important bulletin alert occurs and is in a video Q, all of the video distribution hubs 30A-30E could automatically switch to video feed Q, ensuring quick dissemination of the bulletin alert to the video display screens serviced by video transmission hubs 30A-30E. Similarly, if the video feed to be sent to a specific geographic area is to be changed, then only the transmission hub which services that specific geographic area needs to have any changes made. That transmission hub may merely need to tune into a different video feed.

Figure 2:
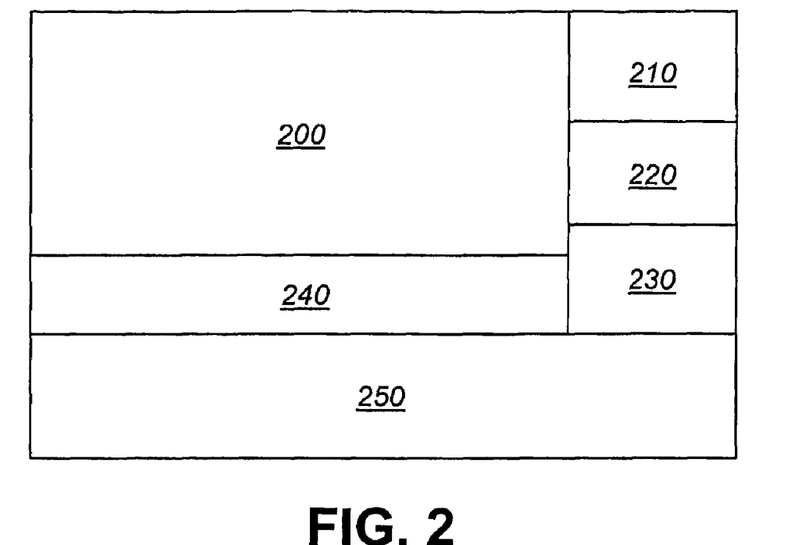
FIG. 2 is a block diagram of an example setup for a video display screen for use with the system of FIG. 1.

It should be noted that, to assist the viewing public in determining the content of the video feed being shown on the display screens, each video feed can be provided with closed captioning. This way, viewers can read the text of the audio for the video feed. It should further be noted that advertising and other relevant data may be inserted into each of the video feeds. This may be done by dividing the visual representation of the video feed into separate areas, with each area being provided with different data. As an example, FIG. 2 illustrates one possible configuration of the visual representation. Area 200 may have the actual moving video being presented (such as a newscast, a situation comedy, or a soap opera program). Area 210 may present the weather forecast for the city, area 220 may present a stock market report and area 230 may present sports scores. Area 240 may be reserved for the closed captioning for the video in area 200 and area 250 may be provided for advertisements that are targeted to the end users. As noted above, the video portions of the presentation (presented in area 200) may be different for different areas. Similarly, different advertisements may be presented for different geographic areas. Ideally, up to ¾ of the display screen may be devoted to advertising space. Devoting such a high proportion of the screen to revenue generating advertising should produce enough revenue for the operation of the system.

Figure 3:
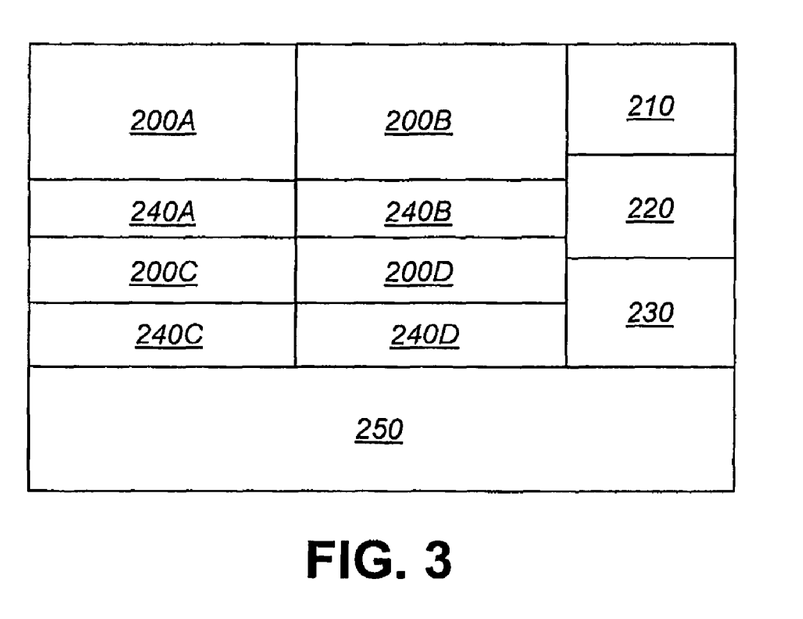
FIG. 3 is a block diagram of another example set up for a video display screen for use with the system of FIG. 1.

Referring to FIG. 3, an alternative arrangement from the visual representational is illustrated. As can be seen, the main area of the screen is divided into multiple areas 200A, 200B, 200C, 200D. Each area may be dedicated to a different network video feed so that end users may have their choice of which program to view. Each video feed has its own audio feed which may be accessed by an end user as will be explained below.

Regarding the video display screens 90A-90K, these display screens are ideally deployed at publicly viewable areas. These may be deployed inside public transportation vehicles such as subway cars and buses and they may be deployed as static installations in subway/bus stations, busy street corners, and other areas of populace concentration. Plasma display screens may be used as the display screens and, in one embodiment, such screens may be hardened and configured to withstand the elements for an outside deployment. Such a deployment may be placed outside moving vehicles such as buses, thereby providing information dissemination to not only commuters inside the vehicle but commuters outside the vehicle as well. For such mobile deployments, wireless technology may be used to transmit the video feed to the video display screens. For static deployments, wired technology such as cable, optical, and other well-known technologies, may be used for the transmission of the video feed to the video display screens. Other static deployments such as inside public transportation vehicles may use flat computer monitors to minimize deployment costs.

To avoid end user confusion due to the multiplicity of programs on a single screen as shown in FIG. 3 static deployments inside transportation stations (e.g. train stations, bus stations, subway stations) and inside transportation vehicles may use multiple display screens with specific screens being dedicated to specific network video feeds. As an example, a single subway car may have 10 screens with 3 screens being assigned to show a specific news channel video feed, (e.g. CNN), 4 screens being assigned to show a specific other broadcast network (e.g. NBC), and the rest being dedicated to show a youth oriented channel (e.g. MTV). The division of the number of screens dedicated to specific types of programming can be determined by the system operator with a view towards the possible viewers given the time of day. As an example, when students are likely to be the viewers, more screens would be dedicated to youth oriented programming.

To further lower deployment costs, manufacturers of the display screens could offer preferential pricing for their screens to those deploying and operating the system. Such a measure would provide the manufacturers free advertising as the public would be exposed to their product for free.

The audio portion of the system 10 operates in a similar manner with one important difference—end users can select which audio feed to access. As noted above, the audio feed signal is received by the audio transmission hubs 40A, 40B. The different audio feeds can be accessed by tuning into or isolating the relevant audio feed from the rest of the audio feed signal. This is what the telephone interface 50 does, along with automatically receiving end user telephone calls and automatically routing the relevant audio feed to the relevant end user telephone call. The telephone interface 50 has multiple tuners with each tuner isolating or tuning into one of the audio feeds in the audio feed signal. Upon a request by an end user who is calling in, the relevant audio feed is diverted or routed to this end user.

The telephone interface 50 acts as an access point for end users. End users can call into the telephone interface (with the relevant telephone number perhaps flashed on the video display screens) and access a specific audio feed. To present a complete audio visual experience in conjunction with that with what is being presented on the video display screens, at least one of the audio feeds could be synchronized with the presentation on the video display screens. As an example, if geographic area A is showing video show A1 on screens 90A-90C and geographic area B is showing video show A2 on screens 901-90K, end users in area A would need to access the audio feed synchronized the video show A1 while end users in the area B would need to access the audio feed synchronized to the video show A2. This may be done by an end user calling the telephone interface 50 and, after navigating an automated answering and menu system, accessing the relevant audio feed. This answering and menu system is well-known technology and is readily available. Thus, an end user in area A would, to get the proper audio visual experience, access a different audio feed from that accessed by an end user in area B. As yet another variant, the audio feed synchronized to a specific video show could be presented in different languages as separate audio feeds. As an example, video show A1 showing on screens 90A-90C could be synchronized to three different audio feeds—one audio feed being in English, another audio feed being in French, and a third audio feed being in Chinese. As such, an end user could access anyone of the video feeds synchronized to that specific video show in the language of preference for the end user. Thus, a single video feed being presented in a specific geographic area could be accessible to people who do not necessarily speak the exact same language. Similarly, the closed captioning presented on the video display screens could be presented in multiple languages or, if one language is predominant in a specific area, the closed captioning could be presented in that single language. The technology for routing audio feeds synchronized to a video feed is currently available and used in passenger aircraft that provides in-flight entertainment. Adapting such technology with appropriate telephone menu technology will produce the requisite telephone interface described above.

It should be noted that the audio feeds available need not all be synchronized to the video feeds. Other audio feeds, such as audio feeds that provide music, commentary, radio station feeds, and others, may be available, depending on the implementation. This system is ideally suited to be accessed by commuters with cellular or mobile phones 260. Commuters, while on their morning or afternoon commute may view the video display screens inside the public transportation vehicle or in the stations while waiting for the vehicles. In concert with this, the commuters can use their mobile telephones to call the telephone interface and listen in on the audio portion of the program being presented in area 200 of the video display screen. Alternatively, the commuter may decide not to view the video program on the video display screen but merely listen to some other audio program being presented as a separate audio feed through his or her mobile telephone. However, the system need not be limited to mobile telephones. End users who have, ideally, a landline speaker phone may also access the telephone interface to listen to the different available audio feeds at work or at home. To address the different tastes of different types of people, themed audio feeds, such as all-sports, all-classical music, all-news or all-music (with different audio feeds for different types of music) may also be available. As an alternative, end users equipped with mobile telephones may receive the different audio feeds using Bluetooth or Wi-Fi (IEEE 802.11) technology.

To accommodate the different regions in a large geographic area, multiple telephone interface/audio transmission hubs may be implemented, with different telephone interfaces serving different areas.

To allow for a financially self-sustaining system, advertising space may be sold on either the video feeds (as explained above) or in the audio feeds. Advertisements may be sold on a per display screen basis, a regional coverage basis, or on a visibility (time visible on screen) basis. Similarly, subscription fees may be collected from end users who wish to access the audio feed. Alternatively, the system could be free to mobile telephone users with the operational and deployment costs being borne by advertisers and/or public transportation bodies.

The system described above is flexible enough for many different types of advertising and promotions. As an example, advertisers could include in their advertising a specific telephone code which users may enter while listening to an audio feed. Entering the code would then automatically connect the end user to the advertiser's telephone call-in center so the end user can then take advantage of the offer (e.g. a vacation trip for a low promotional price). Alternatively, end users may establish an account, with their credit cards on file, with the operators of the system. These end users may then do their shopping over the telephone based on what is being advertised on the display screens. End user choices, such as the color, size, or type of merchandise, could be entered by the end user via the telephone keypad using specific telephone codes shown in the video feeds. To verify an end user's identity, PIN (personal identification numbers) could be associated with each end user account. Such PIN numbers would be required to validate/finalize the transaction before the end user's credit card is charged and before the item is shipped to the end user's on-file address or before the end user can pick up the item. As an alternative, an end user's bank account can be tied in with the end user's system account and the purchase price of the end-user's purchase can be automatically debited to from his/her bank account. The use of PIN numbers or some similar scheme for validation for this configuration would, of course, be required for security. End users can also be provided, by of way of their mobile telephone's screen, with different payment options. A dedicated PAY button on the mobile handset can be provided so that activation of this button brings up the end user's payment option.

The system also offers a myriad of advantages to society and the public in general. It may be used as part of a public broadcasting system to inform the populace of alerts or emergencies. It can also increase literacy as those without mobile phones will need to read the closed captioning and/or the text on-screen to determine what is being presented. It will also produce greater usage of public transportation vehicles as passengers are not only transported from one place to another but are also entertained. Such an increase in ridership may also augur an decrease in the number of vehicles on the road, thereby leading to a more environment-friendly society. The increased advertising may also lead to greater consumer spending, thereby fueling economic growth for the areas where the system is deployed.

Figure 4:
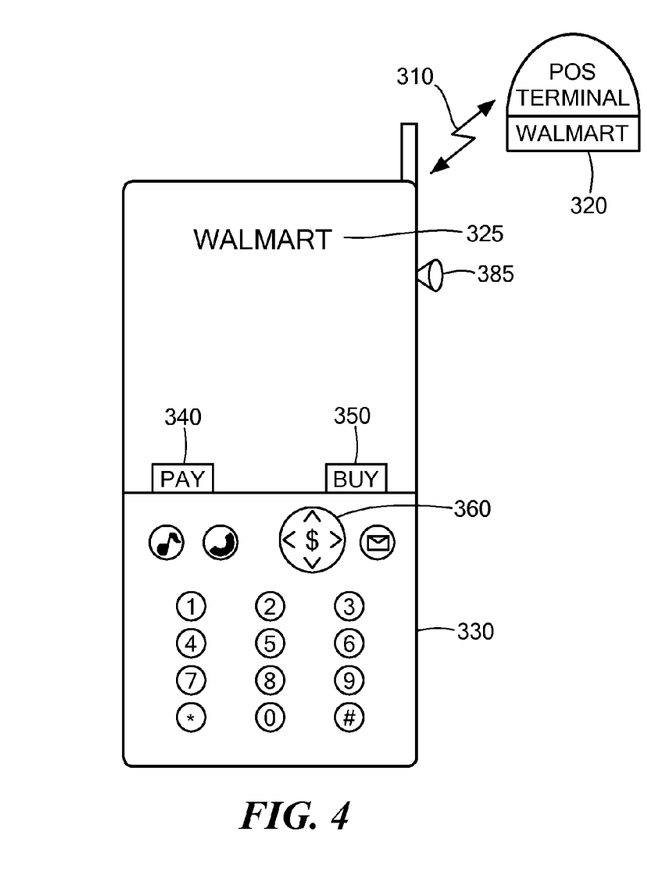
FIGS. 4-7 show steps in making a wireless payment.

FIG. 4 shows a system 310 for acquiring goods and services and dispensing payment in any establishment.

The system 310 includes a POS (point-of-sale) terminal 320 that transmits its ID signal within the perimeter of a commercial establishment. To contain the signal within the boundaries of the establishment, special WI-FI paint can be used to prevent leakage of wireless signals elsewhere.

A portable telephone 330 equipped with an optical input 385, such as a photo camera or scanner, includes a dedicated main actuator 360, labeled in the illustrated embodiment with a suitable currency symbol, such as "$". Depending on the particular telephone, the main actuator 360 can be a button on a front face of the telephone or an icon on a touch screen of the phone. In some embodiments, the main actuator 360 includes the ability to move shift focus to different portions of a display screen by shifting up and down or left to right.

Software integrated into the telephone 330 and POS terminal 320 allows for computing and data exchange between the telephone 330 and the POS terminal 320.

Actuating the main actuator 360 establishes a connection between the telephone 330 and the POS terminal 320 of a particular establishment. This causes the name of the establishment name 325 to be displayed. In addition, actuating the main actuator 360 causes additional navigational icons, such as a PAY icon 340 and a BUY actuator 350 to be displayed, as shown in FIG. 4.

When paying at a cash register, the customer selects the PAY icon 340. This results in the display shown in FIG. 5, in which the customer sees a PAY indicator 341, the establishment name 325, a list of payment options 359a-d, frame boxes 355A-D for receiving additional data, and YES 370 and NO 390 navigational icons.

Figure 5:
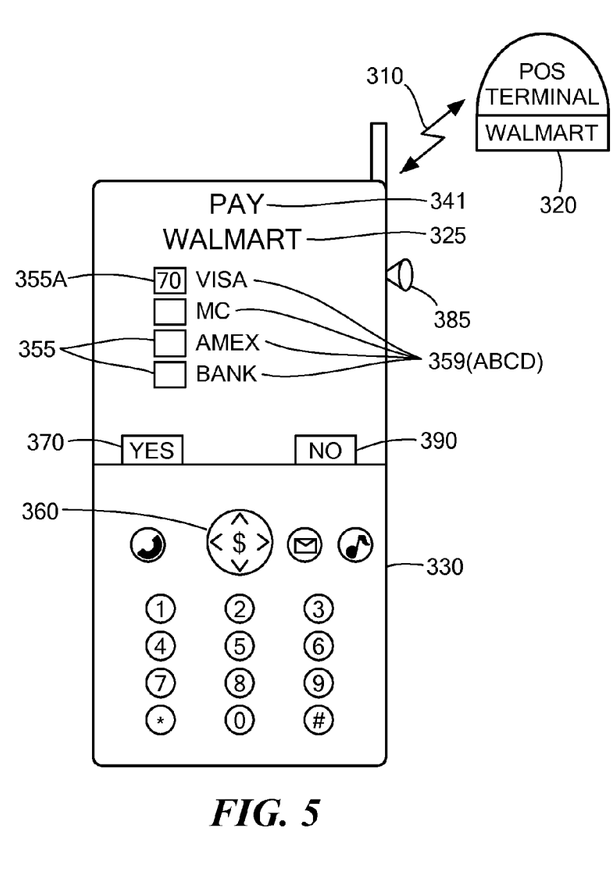

The teller commences scanning products into an establishment terminal (not shown) and announces to the customer the last two digits of an invoice or special code (e.g. "7D") generated by the terminal 310. The customer then enters this special code in a frame box 355A next to the selected method of payment, which in FIG. 5 is the VISA option 359A.

Alternatively other choices of payment can be selected by entering last two digits of the special code into one of the frame boxes 355B-D next to another selected form of payment 359B-D. Available forms of payments can include various credit card companies, customer bank accounts, or systems analogous to PAYPAL. Once the code has been properly entered, the customer selects the YES option 370 to initiate further processing.

Figure 6:
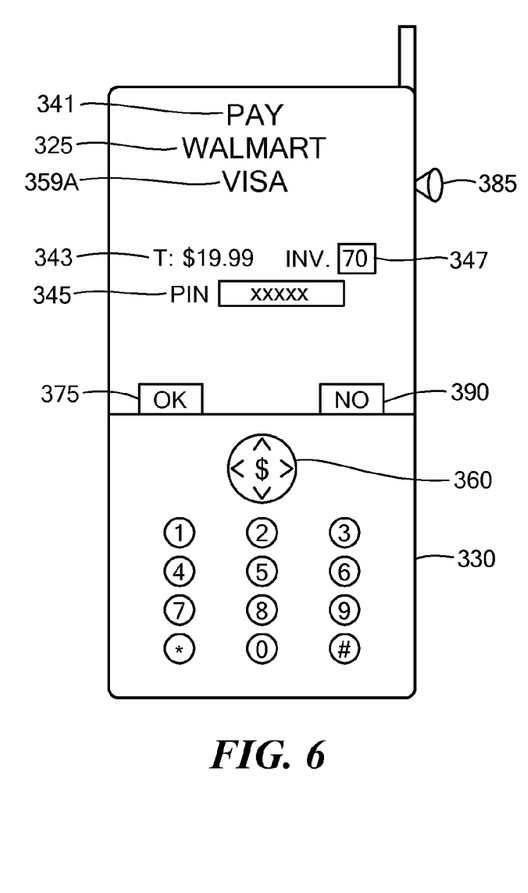

Referring now to FIG. 6, the display changes to now show the PAY indicator 341, the establishment name 325, selected method of payment 359 (in this case VISA), the amount 343, invoice number 347, and PIN box info 345. The customer enters the PIN information 345 and selects an OK icon 375 to commence further processing.

Figure 7:
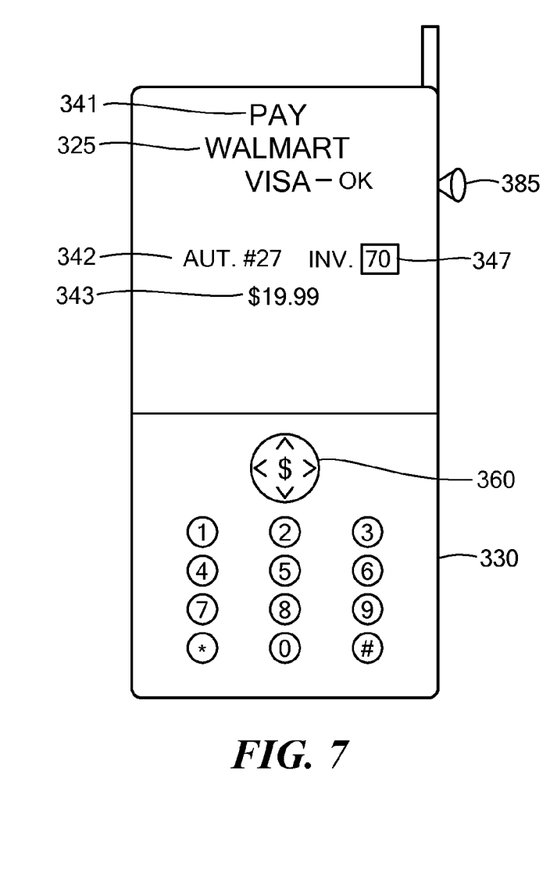

After the processing and authorization 342 takes place, a final e-receipt is issued and stored on the telephone 330, as shown in FIG. 7.

Referring again to FIG. 4, in another mode of operation relies on the BUY icon 350. In this mode, which is used typically while shopping, the actuating the main actuator 360 establishes a connection with the POS terminal 320.

Figure 8:
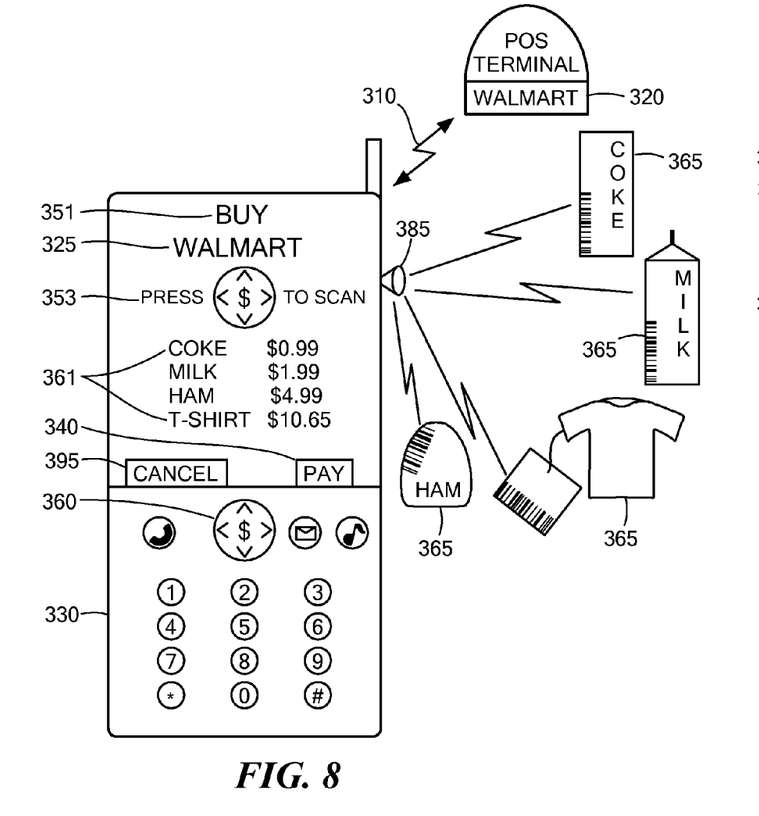
FIGS. 8-11 show steps in wireless shopping.

In response, the screen of mobile phone 330 displays BUY mode 351 status, along with the establishment name 325, and shopping instruction 353, as shown in FIG. 8. In this mode, the customer aims the optical input 385 towards the barcode or special code 365 of the product or merchandise. With the optical input 385 thus aimed, the customer actuates the main actuator 360 to scan the barcode 365. The price is then added to a retail bill 361. This is for multiple items, with the end result being a running tally of selected items, as shown in FIG. 8.

To remove an item from this tally, the customer scans its barcode and selects the CANCEL icon 395. Upon completion of shopping, the customer presses the PAY icon 340 to switch to PAY mode operation.

Figure 9:
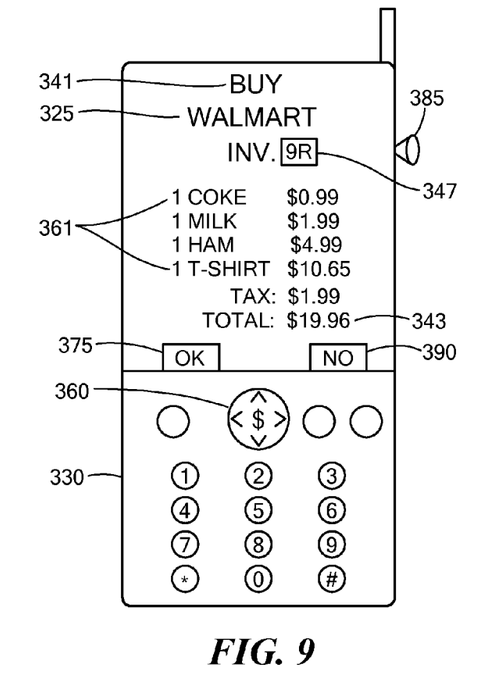

Referring now to FIG. 9, in PAY mode 341, the phone displays the establishment name 325, invoice number 347, list of items 361, total cost 343, and icons OK 375 and NO 390 to either proceed with or cancel the transaction.

Figure 10:
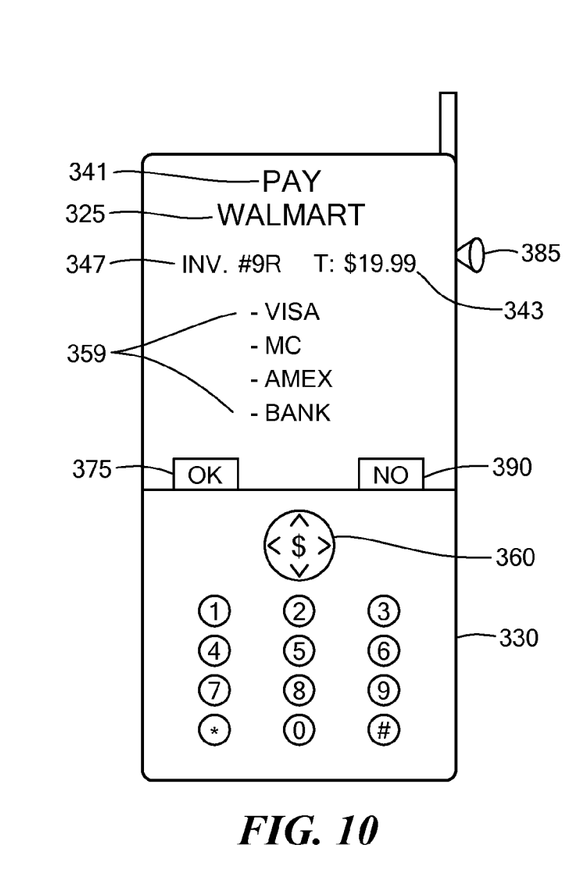
Figure 11:
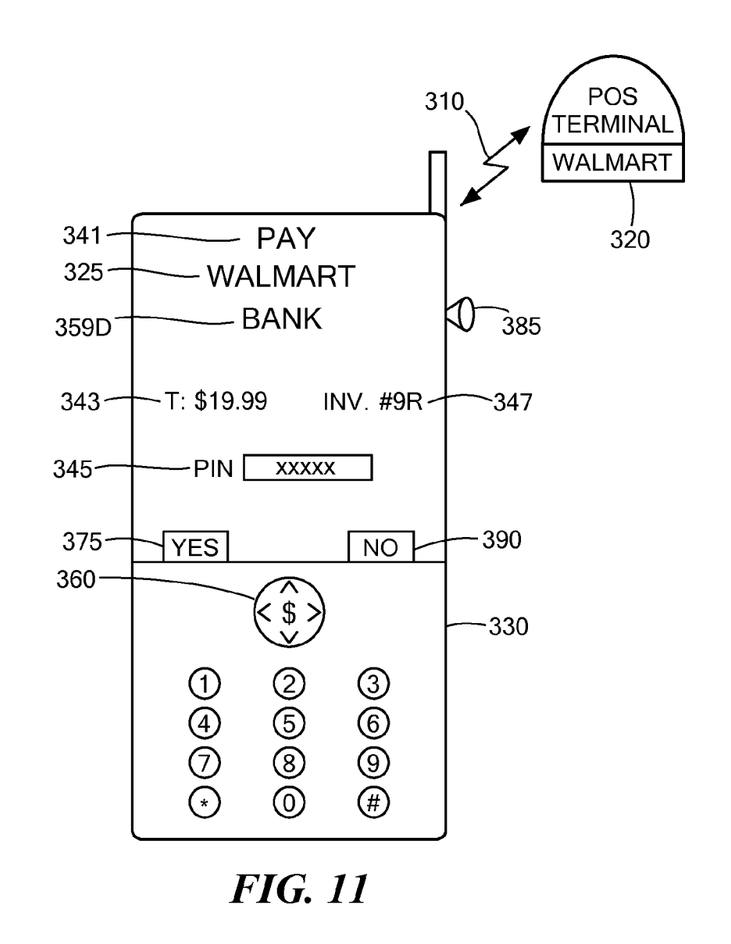

Pressing the OK icon 375 causes the display to transition to the state shown in FIG. 10, in which it invites selection of a payment type. Pressing the OK icon, causes the display to transition to the state shown in FIG. 11, in which the display invites entry of the customer's PIN 345. Activating the YES key 375 then finalizes the sale. Authorization takes place in the processing center and final e-receipt is issued and stored on end user's phone as shown previously in FIG. 7

FIGS. 12-17 illustrate the use of the system in a dining establishment.

Figure 12:
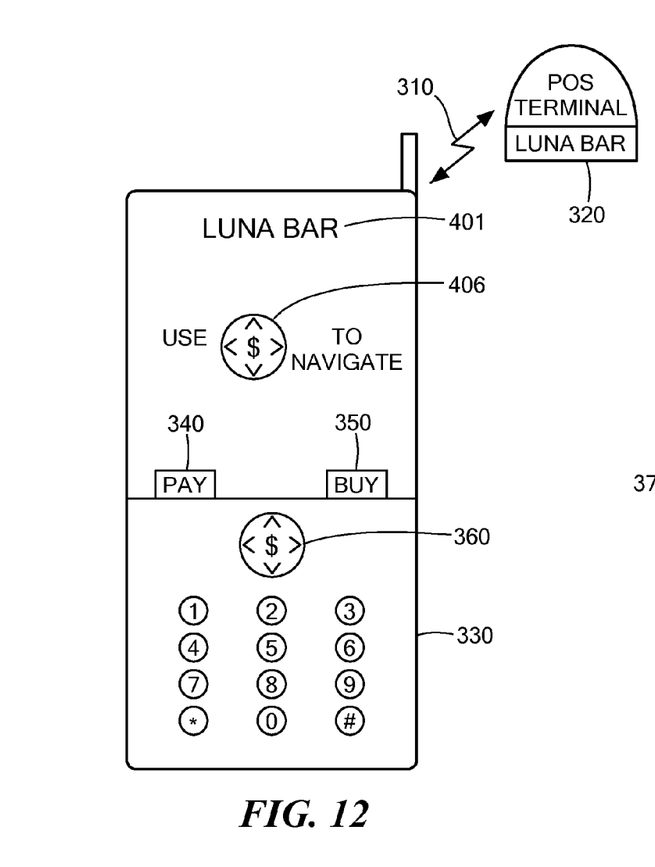
FIGS. 12-17 is a block diagram of a system, when ordering and paying in a bar or restaurant.

Referring first to FIG. 12, upon activating the main actuator 360, connection is established between the phone 330 and the restaurant's POS/terminal 320. This causes display of the restaurant's name 401, navigational instruction 406 for using the dedicated main actuator 360, and a PAY button 340 and BUY button 350 options for further selection.

Selecting PAY 340 causes the phone to initiate a transaction similar to that described in connection with FIGS. 4-7. The main distinction is that in the case of a restaurant, the server either brings a physical bill at the table or sends data representative of the bill to the customer's phone. This can be carried our, for example, upon obtaining the last four digits of the customer's telephone number.

Pressing BUY 350 causes the phone to initiate operation in a manner similar to that described in connection with FIGS. 8-11, with the difference being that no scanning of bar codes is necessary. Instead, a menu 410 is displayed, complete with its sub sections 411 (i.e. appetizers, pasta, fish, meat, drinks). In this state, the phone also displays YES 370 and NO 390 buttons.

Figure 13:
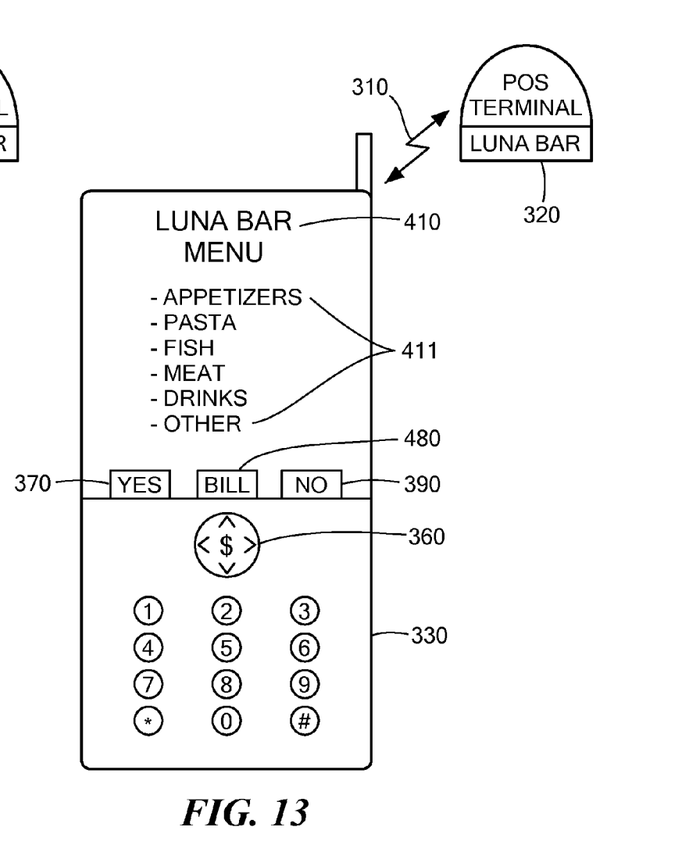

To make selections from the menu, one scrolls up and down the menu 411 pressing the YES icon 370 either to select an item or to enter a sub-menu corresponding to one of the sub-sections 411, as shown in FIG. 13.

Figure 14:
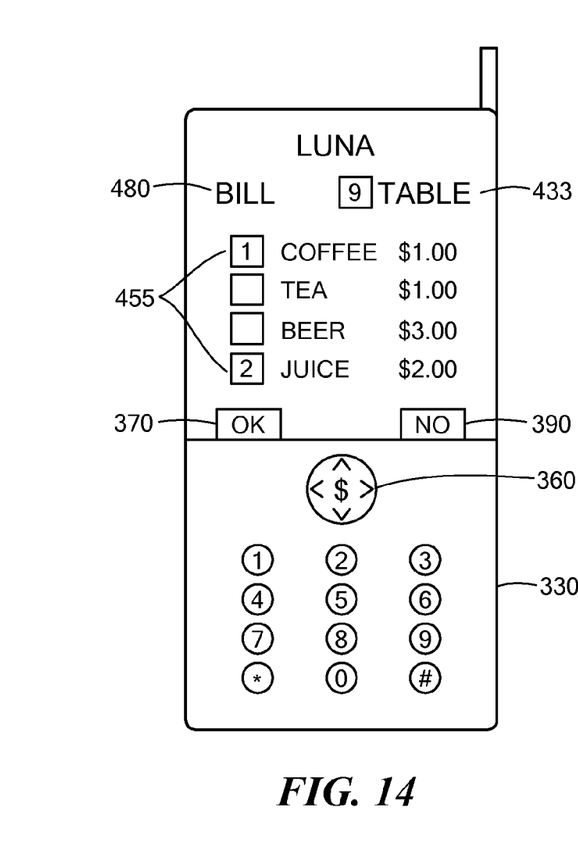

Pressing OK icon 370 on selected item from the sub-menu automatically opens a BILL 480 screen containing an order list, as shown in FIG. 14, with each item having a frame 455 next to it for receiving information about how many units of that item are to be ordered. This data can be entered using the telephone's numeric keypad. The display further includes a frame 433 for receiving a table number (in this case table #9). This table number must be entered before selecting or ordering any items. Pressing the NO key 390 removes a selected item from the order list. Pressing the OK key 370 key returns to the sub-menu screen for further selections. Pressing the BILL key 480 icon allows viewing already selected items.

Figure 15:
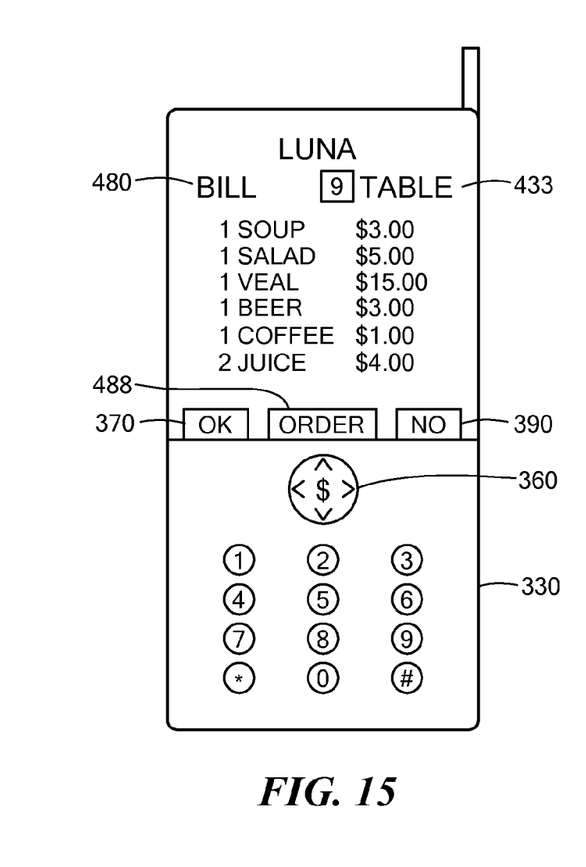

Once selections have been made, the customer presses the ORDER key 488 to send the full order information to the POS, as shown in FIG. 15.

In the case of restaurant dining, the customer order remains in open check status. After all, the customer may want more drinks, or perhaps even another entrée.

To modify or add on items, the customer presses the main actuator 360 followed by the BUY key 350. This brings the customer to the menu selection shown in FIG. 13. The customer then presses the OTHER icon from the sub menu 411 to make necessary changes, and presses the OK icon 370 to add new items to the total for the customer's table.

Figure 16:
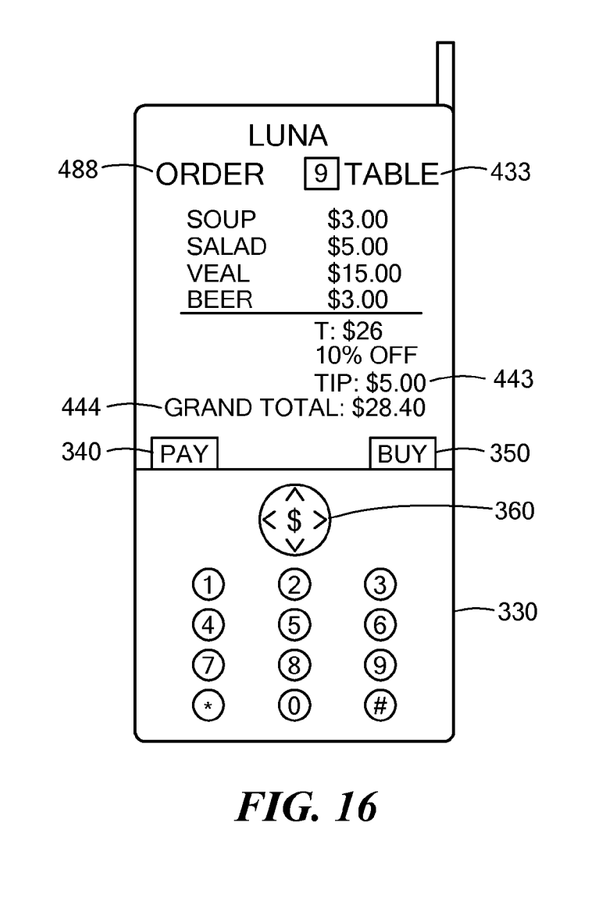

To make a payment, the customer presses a PAY button 340. This causes display of a total due amount 444 and optional gratuity 443, as shown in FIG. 16.

Figure 17:
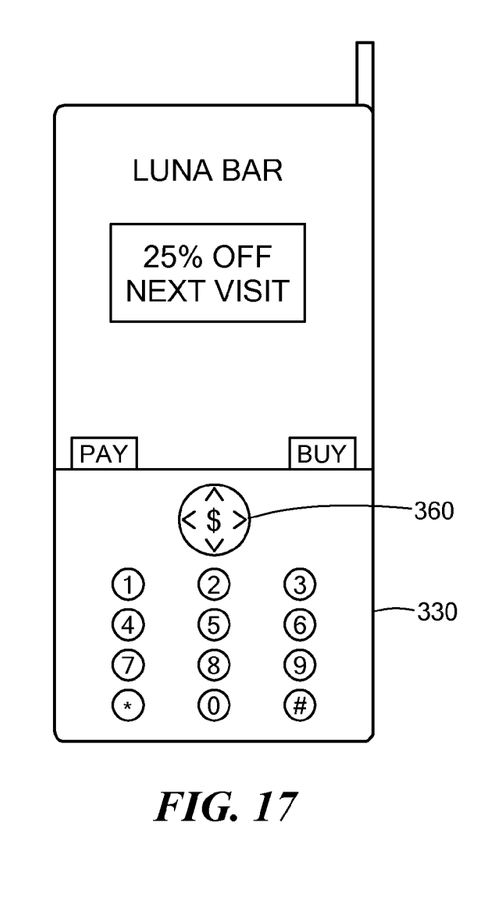

Depending the amount spent and on how often the diner has visited restaurant, the system may provide a discount coupon may be issued, as shown in FIG. 17. This coupon can be automatically applied the next time the customer dines at the restaurant.

The foregoing system provides numerous benefits to the public by eliminating or shortening queues at ATM in rush hours, carry cash, a wallet, plastic cards, and also by eliminating the time-consuming wait at the cash register to make payment.

Encrypted software will be implemented to carry out safe and secure wireless transactions.

In case of lost phone, the phone's various functions remain protected by the PIN. In addition, a carrier has been notified of a lost or stolen phone can remotely erase all the data from phone.

A system as described above can be used for purchase of items, goods, products and services in a variety of locations such as, but not limited to, businesses/stores, supermarkets, gas stations, restaurants, shopping malls by entering, scanning, photographing, or copying a barcode or special price code using a mobile phone equipped with a scanner, reader, or camera.

Although various exemplary embodiments of the invention have been disclosed, it should be apparent to those skilled in the art that various changes and modifications can be made which will achieve some of the advantages of the invention without departing from the true scope of the invention.

A person understanding this invention may now conceive of alternative structures and embodiments or variations of the above all of which are intended to fall within the scope of the invention as defined in the claims that follow.

Having described the invention, and a preferred embodiment thereof, I now claim as new, and secured by Letters Patent:

1. An apparatus for engaging in wireless commercial transactions, said apparatus comprising: a mobile phone equipped with a dedicated actuator for initiating a commercial transaction, and an optical input for receiving information concerning prices of goods; a network hub for wireless exchange of information between a commercial establishment and said mobile phone within the boundaries of the establishment; and a financial/authorization institution for associating a PIN number with said mobile phone and for authorizing transactions initiated by said mobile phone, wherein a terminal associated with a point of sale at the commercial establishment generates a code to be entered in the phone to further the transaction.

2. The apparatus of claim 1, wherein the mobile phone is configured to display information about goods scanned by said optical input on a display.

3. The apparatus of claim 1, wherein the mobile phone is configured to provide a sequence of displays to guide a user of said mobile phone through a commercial transaction that includes identification of goods to be purchased and payment associated with said purchase.

4. The apparatus of claim 1, wherein the mobile phone is configured to generate a listing of items available for purchase.

5. The apparatus of claim 4, wherein the mobile phone is further configured to solicit a selection of a subset of items from said listing.

6. The apparatus of claim 1, wherein the mobile phone is configured to display information concerning an incomplete commercial transaction.

7. The apparatus of claim 1, wherein a communication between the mobile phone and the network hub is constrained to remain within the commercial establishment.

8. The apparatus of claim 1, wherein the dedicated actuator comprises a button labeled with a symbolic indication of a function thereof.

9. The apparatus of claim 8, wherein the button comprises a touch-sensitive region on a display of the mobile phone.

10. The apparatus of claim 1, wherein actuation of the dedicated actuator causes information identifying the commercial establishment to be displayed on the mobile phone.

11. The apparatus of claim 1, wherein actuation of the dedicated actuator causes display of a button to consummate a commercial transaction.

12. The apparatus of claim 1, wherein the mobile phone is configured to, on the basis of data provided by the optical input, display a price of an item.

13. The apparatus of claim 1, wherein the mobile phone is configured to receive a coupon applicable to a future transaction with the commercial establishment.

14. The apparatus of claim 1, wherein the mobile phone is configured to be remotely erased by the financial/authorization institution.

15. An apparatus for engaging in wireless commercial transactions, said apparatus comprising: a mobile phone equipped with a dedicated actuator for initiating a commercial transaction, and an optical input for receiving information concerning prices of goods; a network hub for wireless exchange of information between a commercial establishment and said mobile phone within the boundaries of the establishment; and a financial/authorization institution for associating a PIN number with said mobile phone and for authorizing transactions initiated by said mobile phone, wherein actuation of the dedicated actuator causes display of a button to consummate a commercial transaction.

16. The apparatus of claim 15, wherein said mobile phone is configured to display information about goods scanned by said optical input on a display.

17. The apparatus of claim 15, wherein the mobile phone is configured to provide a sequence of displays to guide a user of said mobile phone through a commercial transaction that includes identification of goods to be purchased and payment associated with said purchase.

18. The apparatus of claim 15, wherein the mobile phone is configured to generate a listing of items available for purchase.

19. The apparatus of claim 10, wherein the mobile phone is further configured to solicit a selection of a subset of items from said listing.

20. The apparatus of claim 15, wherein the mobile phone is configured to display information concerning an incomplete commercial transaction.

21. The apparatus of claim 15, wherein a communication between the mobile phone and the network hub is constrained to remain within the commercial establishment.

22. The apparatus of claim 15, wherein the dedicated actuator comprises a button labeled with a symbolic indication of a function thereof.

23. The apparatus of claim 22, wherein the button comprises a touch-sensitive region on a display of the mobile phone.

24. The apparatus of claim 15, wherein actuation of the dedicated actuator causes information identifying the commercial establishment to be displayed on the mobile phone.

25. The apparatus of claim 15, wherein a terminal associated with a point of sale at the commercial establishment generates a code to be entered in the phone to further the transaction.

26. The apparatus of claim 15, wherein the mobile phone is configured to, on the basis of data provided by the optical input, display a price of an item.

27. The apparatus of claim 15, wherein the mobile phone is configured to receive a coupon applicable to a future transaction with the commercial establishment.

28. The apparatus of claim 15, wherein the mobile phone is configured to be remotely erased by the financial/authorization institution.

* * * * *